US012350232B2

United States Patent
Leoni et al.

(10) Patent No.: US 12,350,232 B2
(45) Date of Patent: Jul. 8, 2025

(54) SELF CENTERING VIAL HOLDER FOR IMMERSION PROBES

(71) Applicant: Thermo Scientific Portable Analytical Instruments Inc., Tewksbury, MA (US)

(72) Inventors: Andrew Leoni, Billerica, MA (US); Michael Dugas, Londonderry, NH (US); Sue Woods, Sutton, MA (US); Eden Couillard, Tewksbury, MA (US); Nimesh Khadka, Dracut, MA (US); Eric Martin, Medford, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 79 days.

(21) Appl. No.: 18/492,457

(22) Filed: Oct. 23, 2023

(65) Prior Publication Data

US 2024/0133815 A1   Apr. 25, 2024
US 2024/0225957 A9   Jul. 11, 2024

Related U.S. Application Data

(60) Provisional application No. 63/380,617, filed on Oct. 24, 2022.

(51) Int. Cl.
*A61J 1/16* (2023.01)
(52) U.S. Cl.
CPC ..................................... *A61J 1/165* (2013.01)
(58) Field of Classification Search
CPC ...... G01N 1/10; G01N 21/01; G01N 21/8507; G01N 2021/651; A61J 1/165

USPC .......................... 356/244, 246; 206/562, 569
See application file for complete search history.

(56) References Cited

U.S. PATENT DOCUMENTS

| 3,695,772 A * | 10/1972 | Spyropoulos | .......... G01N 21/03 |
| | | | 356/246 |
| 2005/0180895 A1 | 8/2005 | Itoh | |
| 2020/0122148 A1* | 4/2020 | Cunningham | ............ B01L 9/06 |
| 2021/0096128 A1 | 4/2021 | Peyser et al. | |
| 2022/0220430 A1 | 7/2022 | Abadian et al. | |
| 2023/0364602 A1* | 11/2023 | Gilboa-Geffen | ........ B01L 3/502 |

FOREIGN PATENT DOCUMENTS

| CN | 101688825 A | 3/2010 |
| CN | 107843525 A | 3/2018 |

OTHER PUBLICATIONS

Marks K., et al., "A Portable Silicon Photodiode Luminometer," Journal of Bioluminescence and Chemiluminescence, May 1, 1987, vol. 1, No. 3, XP008033926, pp. 173-179.

(Continued)

*Primary Examiner* — Jacob K Ackun

(57) ABSTRACT

A holder is described. The holder is for a sample vial and includes a base and a cap, where the holder and cap include one or more materials that are opaque or optically black. The holder includes an interior space for placement of the vial in a light-tight environment, where the holder cap includes an opening for insertion of a probe therethrough and into the sample vial. The disclosure also includes systems and methods using the holder.

20 Claims, 8 Drawing Sheets

(56) References Cited

OTHER PUBLICATIONS

Meyer-Kirschner J., et al., "In-line Monitoring of Monomer and Polymer Content During Microgel Synthesis Using Precipitation Polymerization via Raman Spectroscopy and Indirect Hard Modeling," Applied Spectroscopy, Mar. 1, 2016, vol. 70, No. 3, XP055866894, pp. 416-426.

PCT/US2023/077546, International Search Report and Written Opinion, Feb. 12, 2024, 12 pages.

* cited by examiner

SELF CENTERING VIAL HOLDER FOR IMMERSION PROBES

CROSS-REFERENCE TO RELATED APPLICATIONS

This application claims priority to U.S. application No. 63/380,617 filed Oct. 24, 2022, which disclosure is herein incorporated by reference in its entirety.

FIELD OF THE INVENTION

This invention is directed to a vial holder. In particular, a vial holder providing a lighttight environment to the vial during a measurement with an immersion probe is described.

BACKGROUND OF THE INVENTION

Immersion probes are probes that can be partially or wholly immersed in a sample to measure sample properties. Such probes can include, for example, pH probes, conductivity probes, temperature probes, as well as UV-Vis and Raman probes. Although also useful for solids such as powders, immersion probes are more often used for liquid samples such as chemical and biological mixtures as well as for suspensions and dispersions. Immersion probes are advantageous for analysis of batch processes, continuous processes, and for use in flow cells.

It is also a routine procedure both in manufacturing and laboratory testing for a sample from a batch or continuous process to be collected in small sample containers such as vials, test tubes and the like. The sample is tested to monitor the progress of a reaction, growth of cells, or other ripening processes. Immersion probes are a convenient way to test for a property of the sample directly in the sample vial. The exclusion of light while measuring with the immersion probe is often advantageous or even at times necessary depending on the nature of the measurement. For example, for UV-vis and Raman measurements, stray ambient light in the measurement energies of the probe can create unwanted signals that cause a decrease in signal to noise or even completely obscuring an important measurement signal.

Although amber or opaque containers are available that may exclude certain light energies, more typical and economical containers are made with clear plastic or glass. In many cases, transparent vials are wrapped with light obscuring materials to try to provide a lighttight environment for the sample container. For example, US Patent Publication 2022/0220430 describes covering glass vials or beakers to eliminate light interference with Raman scattering measurements. Practitioners also know that temporary coverings formed, for example when using aluminum foil, often need to be checked and adjusted to ensure adequate light elimination. In addition to being lighttight, in some cases the walls of the sample container can cause interference with the measurement, for example fluorescing when excited by the probe. Ensuring that the probe is not too close to or touching the container walls is an additional adjustment that can frustrate or add time to sample collection.

There is therefore an unmet need to measure samples in a vial using an immersion probe that provides a well-centered probe in a lighttight environment.

SUMMARY

Systems, methods, and products to address these and other needs are described herein with respect to illustrative, non-limiting, implementations. Various alternatives, modifications and equivalents are possible.

According to a first aspect, a holder is described. The holder includes a base and a cap, wherein the base and the cap include one or more materials that are opaque or optically black. The base includes: a first end including a bottom configured for placement of the base on a substantially flat surface; a second end extending from the first end; an opening in the second end opposite the bottom and providing access to an interior space in the base, said interior space configured for placement of a vial therein; and an aperture in the bottom, opposite the opening, and said aperture is in fluid communication with the interior space. The cap is configured to mate with the second end and includes an inlet configured to accept a probe through the inlet and opening and centrally into the vial.

According to a second aspect, a system for measuring a signal from a sample is described. The system includes the holder according to the first aspect as well as an adjustable probe arm.

According to a third aspect, a method for measuring scattered light is described. The method includes: placing a sample in a vial, placing the vial in the holder according to the first aspect; inserting a probe through the inlet of the cap and immersing the probe into the sample; irradiating the sample with light from the immersed probe; and collecting scattered sample light into the probe.

The holder provides a lighttight measurement environment to a sample for measurement using an immersion probe. The holder also guides and holds the probe so that it is centered in the vial during the measurement.

BRIEF DESCRIPTION OF THE DRAWINGS

The foregoing and other features and advantages of the present embodiments will be more fully understood from the following detailed description of illustrative embodiments taken in conjunction with the accompanying drawings.

FIG. 2A show an isometric view; FIG. 2B shows a front view; FIG. 2C shows a top view; and FIG. 2D shows a bottom view.

FIG. 3A is a front view, while FIG. 3B is a bottom view.

FIG. 4A is a front view, FIG. 4B is a top view, and FIG. 4C is another front view.

FIGS. 5A and 5C are front views, and FIGS. 5B and 5D are top views.

Figure 1:
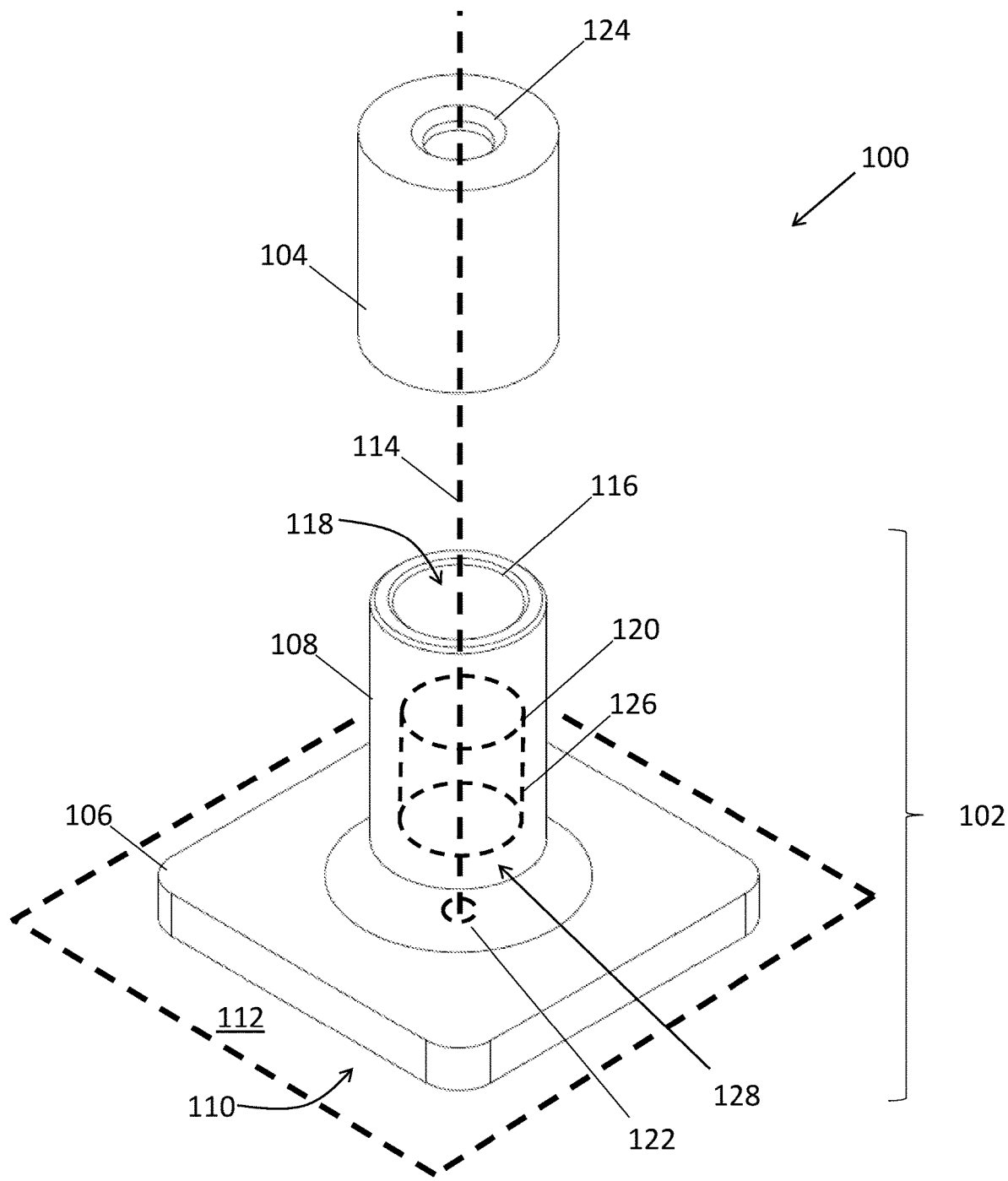
FIG. 1 is a 3D view of a holder, according to some implementations.

The figures referred to above are not drawn necessarily to scale, should be understood to provide a representation of particular embodiments, and are merely conceptual in nature and illustrative of the principals involved. The same reference numbers are used in the drawings for similar or identical components and features shown in various alternative embodiments.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the statistical dispersion found in their respective testing measurements.

Figure 2A:
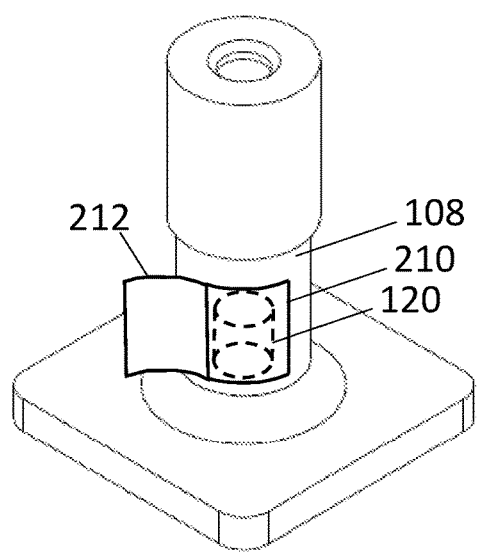
FIG. 2A-2D show the holder of FIG. 1 from different views.
Figure 2B:
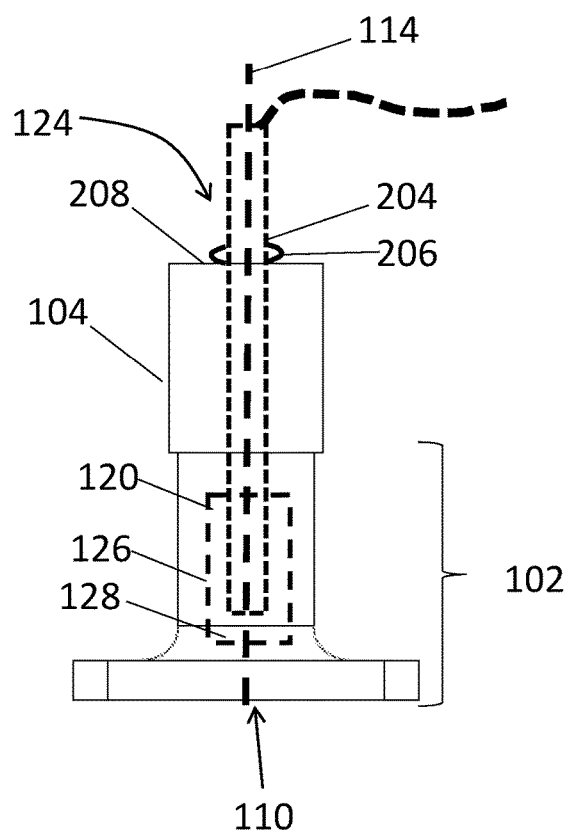
Figure 2C:
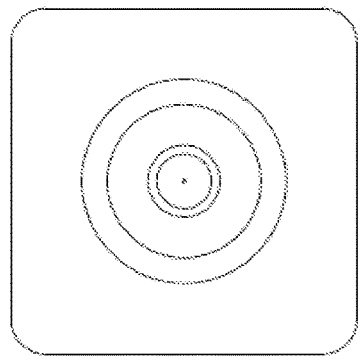
Figure 2D:
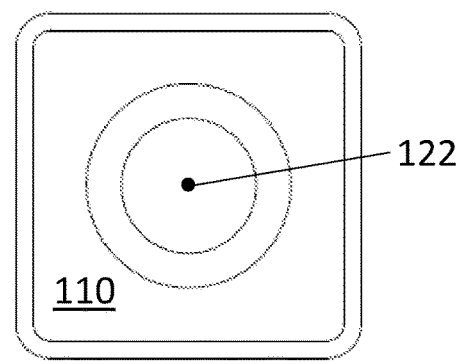

FIG. 1 is a 3D view of a holder 100, according to some implementations. The vial holder 100 includes a base 102 and a cap 104, where the view is with the cap 104 removed from, and positioned above, the base 102. FIG. 2A-2D show the holder 100 from different views. FIG. 2A show an isometric view. FIG. 2B shows a front (or one of the other 3 sides due to symmetry) view. FIG. 2C shows a top view. FIG. 2D shows a bottom view. Most features can be seen by FIG. 1, although the other views are referred to at times.

Figure 3A:
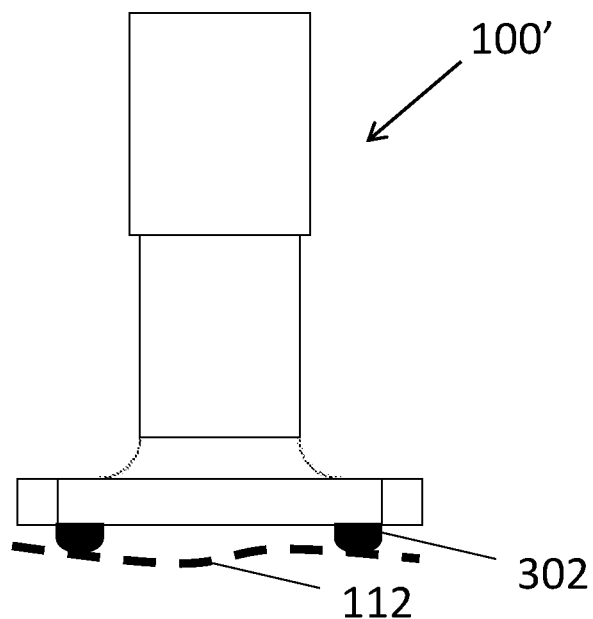
FIG. 3A-3B show views of a vial holder, according to some implementations.
Figure 3B:
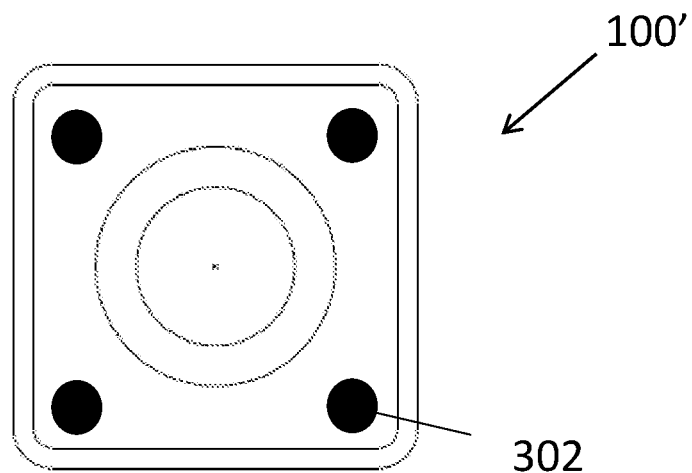

The base 102 includes a first end 106 and a second end 108. The first end 106 includes a bottom 110 that is configured for placement of the base 102 on a substantially flat surface 112. In the implementations shown by FIG. 1 the bottom 110 has a flat surface that contacts the substantially flat surface 112. However, other implementation of the holder 100 can include the bottom 110 having legs or other support structures that can also be place on the substantially flat surface 112. For example, an optional implementation of a holder 100' can include protruding features 302 as shown in front view FIG. 3A and bottom view FIG. 3B. Accordingly, the substantially flat surface 112 can include curvature, discontinuities or other features as shown in FIG. 3A. The substantially flat surface 112 accordingly is a surface where the bottom 110, which can include features such as 302, can be placed and where the base 102 is supported in a stable fashion (i.e., does not rock or shift). For example, and without limitation, the substantially flat surface 112 can be a laboratory bench or table. In some implementations, the bottom 110 can be magnetic or include a magnet, for example, the features 302 can include magnets. In some implementations, the bottom 110 can include suction cups, for example, the features 302 can be formed as suction cups that attach to the substantially flat surface 112. In some implementations, the substantially flat surface 112 is also substantially level with the horizon.

The second end 108 of the base 102 extends from the first end 106. For example, the second end 108 extends along an axis 114 (FIG. 2B). In some implementations, the second end 108 extends from the first end 106 in a direction that is perpendicular to the substantially flat surface 112. For example, an angle defined by the axis 114 and the substantially flat surface 112 is about 90 deg. In other implementations, the second end 108 extends from the first end 106 at an angle with respect to the substantially flat surface 112 that is less than 90 deg. For example, the angle defined by the axis 114 and the substantially flat surface 112 is between 45 and 90 deg (e.g. between 60 and 90 deg, or between 80 and 90 deg).

The second end 108 includes an opening 116 (FIG. 1) formed or positioned opposite to the bottom 110. The opening 116 provides access to an interior space 118 which is configured for placement of a vial 120 (e.g., container, test tube etc.) therein. The interior space 118 can provide a generally snug fit for the vial 120. As use here "snug" or a "snug fit" refers to a tight fit such that the outer surfaces of the vial 120, such as the outer surface of side wall 126, and the proximate inner surfaces of the interior space 118 touch at least partially, or have a very small gap between them (e.g. less than 5%, 2% or 1% of the diameter of the vial 120). The outer surface of bottom wall 128 of the vial 120 touches or rests on a bottom inner surface of the interior space 118 by virtue of gravity. Although the interior space 118 and the vial 120 are cylindrical in the implementations shown, this should not be considered limiting since other geometries such as enclosures to accommodate rectangular vials or other shapes are contemplated as other implementations. In some implementations, the interior side walls are not smooth, for example including divots, ridges, or undulations.

The second end 108 also includes an aperture 122 formed/located opposite the opening 116. The aperture 122 forms a channel or conduit to the interior space 118 and is configured/designed to provide fluid access into or out of the interior space 118. This can be advantageous for allowing draining of solutions/liquids after sterilization/cleaning. The aperture 122 also facilitates placement/removal of the vial 120 into the base 102 through opening 116 by allowing air to escape/enter through the aperture 122. In implementations where non-smooth interior side walls are used, such as having vertical grooves, the grooves can serve the purpose of facilitating placement/removal of the vial 120 into the base 102. Although shown directly opposite and centered in bottom 110, the aperture 122 can be off-center, and the aperture 122 can be of any shape. In some implementations, the aperture 122 can also be positioned on another wall of the base 102, rather than at the flat surface of the bottom 110 that contacts the substantially flat surface 112. In implementations where light or other radiation can enter through the aperture 122, an optically black or opaque plug configured to mate with the aperture 122 can be included. Alternatively, or additionally, the aperture can follow a tortuous path from outside of the base 102 to the interior space 118 to reduce or eliminate light leaking into interior space 118. It is also noted that in implementations where the bottom 110 is substantially flat, and the holder 100 is place on the substantially flat surface 112, light is blocked from entering the interior space through aperture 122, provided substantially the flat surface 112 is formed of a material that is opaque or optically black (e.g. a non-transparent table). Accordingly, in some implementations, the cap 104, probe 204, base 102 and the substantially flat surface 112 provide a lighttight environment to the interior space 118. In some other implementations, the plug configured to mate with the aperture 122 as well as the cap 104, probe 204, base 102 and the substantially flat surface 112 provide a lighttight environment to the interior space 118.

The cap 104 is configured to reversibly mate with the second end 108 and includes an inlet 124. The inlet 124 provides or is configured to accept a probe 204 (FIG. 2B) therethrough and into opening 116 where the probe 204 is guided, by the inlet 124, centrally into the vial 120. As used here, centrally refers to the probe 204 and vial 120 being aligned along axis 114 where the probe 204 does not contact the inner surface of side wall 126 of the vial 120. In some implementations, a stopping element 206 is included with the holder 100. The stopping element 206 can be permanently or removably attached to the probe 204 and provides a stop against the top surface 208 of cap 104. This controls the depth the probe 204 can descend into the vial 120. For example, the position of the stopping element 206 can be selected so that the probe 204 does not touch a bottom inner surface of the wall 128 of the vial 120. In some implementations, the stopping element 206 is an adjustable ring such as an adjustable ring clamp, or a compressible/stretchable ring such as a rubber washer or ferrule. The stopping element 206, in some implementations, also provide a lighttight seal so that stray radiation cannot enter through any gap between the probe 204 and the inlet 124.

The cap 104 is removable from the base 102. In some implementations, the mating surfaces of the cap 104 and the base 102 are tapered to provide a snug and friction secured coupling. In some implementations, the mating surface includes snap-fit features to secure the coupling. In yet other implementations, the mating surfaces include corresponding threads for screwing them together. Other fasteners of the like can be implemented to secure the cap 104 in position on second end 108. In some implementations, a flexible tether is included to attach the base 102 to the cap 104 that allows removal of the cap 104 from the base 102, while ensure the cap 104 and base 102 are not separated/lost.

The holder 100 is constructed of materials that are opaque or optically black. The selection of materials is determined by the use. For example, materials are chosen to reduce or obscure radiation of the same energy as emitted or collected by the probe 204 and that might interfere with the measurement of the radiation (e.g. scattered, emitted) from the sample. The materials thereby provide a radiation tight environment, in the energies of interest, to the vial when it is placed in the holder 100. For example, in some implementations, the materials provide a lighttight environment. In some implementations the material is optically black in a range of 500 to 1200 nm. In some implementations, the material transmits less than about 99% of light in the range of 500 to 1200 nm.

In some implementations, the holder 100 also includes a window 210 and window cover 212 formed in a side wall of the base 102. Due to clarity these features are not shown in FIG. 1, but they are shown in FIG. 2A. The window 210 can be an opening to the interior space 118 or can include a transparent see-through barrier. The window 210 can be used to position the probe 204 to the desired depth in the vial 120. In some implementations, the window 210 is large enough to position the vial 120 in the interior space 118. In other implementations, the window 210 is smaller than dimensions that would allow for the vial 120 to be placed therethrough.

In some implementations, the window cover 212 is a door that is hinged. In other implementations, the window cover 212 is completely removable and snaps in place to cover the window 210. In alternative implementations, the window cover 212 slides on rails or guides mounted on the second end 108 to cover the window 210. Other implementations include the window cover 212 formed as a semi-concentric cylinder wrapped around the second end 108 that can rotate around the axis 114 (FIG. 2B) to cover the window 210. In some implementations, the window cover 212 is under tension causing it to stay closed or open. For example, tension can be provided by a spring. In such implementations a latch can be included that is engaged to hold the window cover 212 open, if the cover 212 is tensioned to stay closed, or the latch is engaged to hold the window cover 212 closed, if the window cover 212 is tensioned to stay open. In some implementations, the opening and closing of the window cover 212 can be operated single handedly, such as including a release button or latch. The window cover 212 includes an opaque or optically black material and is configured to provide an optically tight (e.g., radiation-tight, light-tight) seal to window 210.

In some implementations, the inlet 124 of the cap 104 incudes sealing elements configured to adjust for probes 204 having different diameters. For example, the sealing elements can include an O-ring, sleeves, or a set of these having different diameters. The inlet 124 can include a groove or rim for placement of the sealing element such as an O-ring. Alternatively or additionally, the stopping element 206 previously discussed with reference to FIG. 2B can act as the sealing element.

Figure 4A:
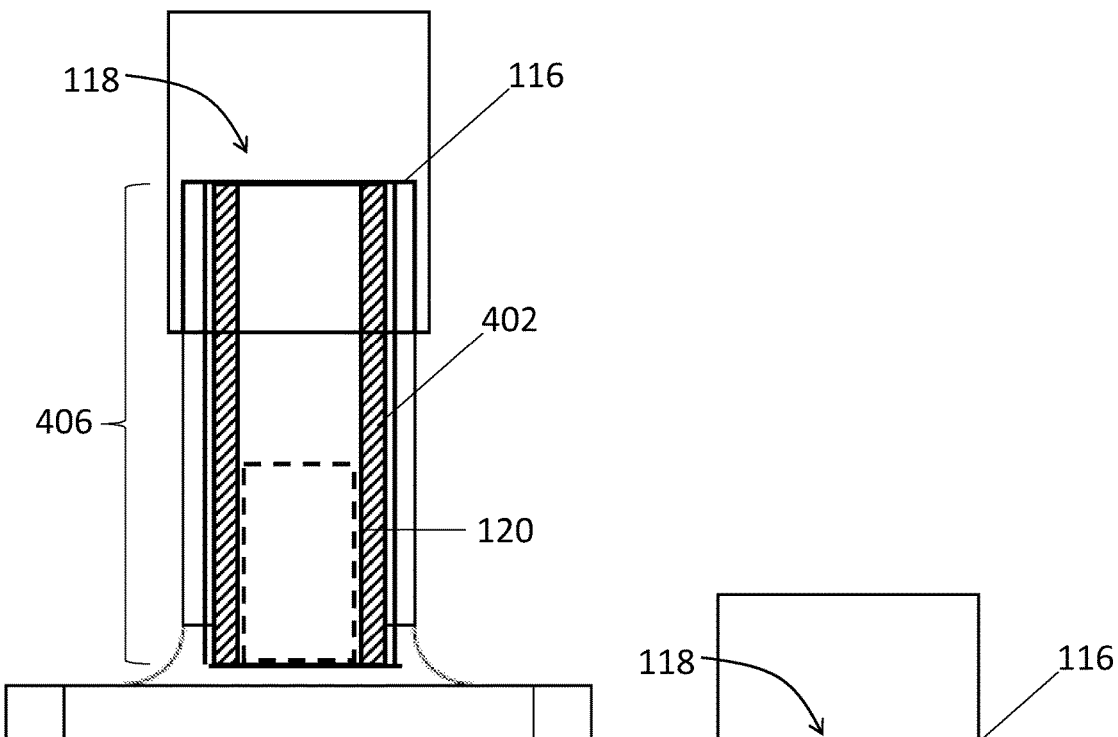
FIG. 4A-4C show a vial holder including a sleeve, according to some implementations.
Figure 4B:
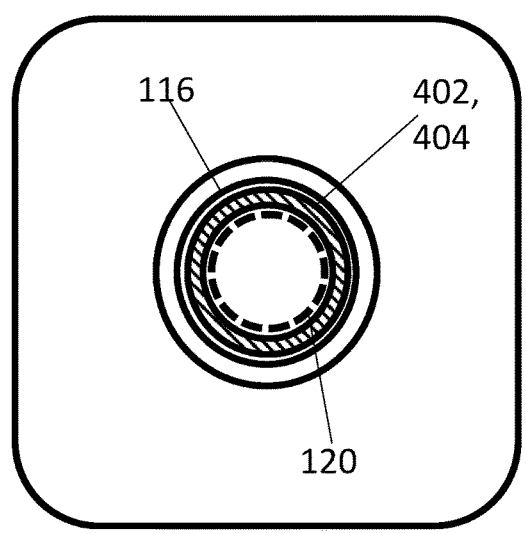
Figure 4C:
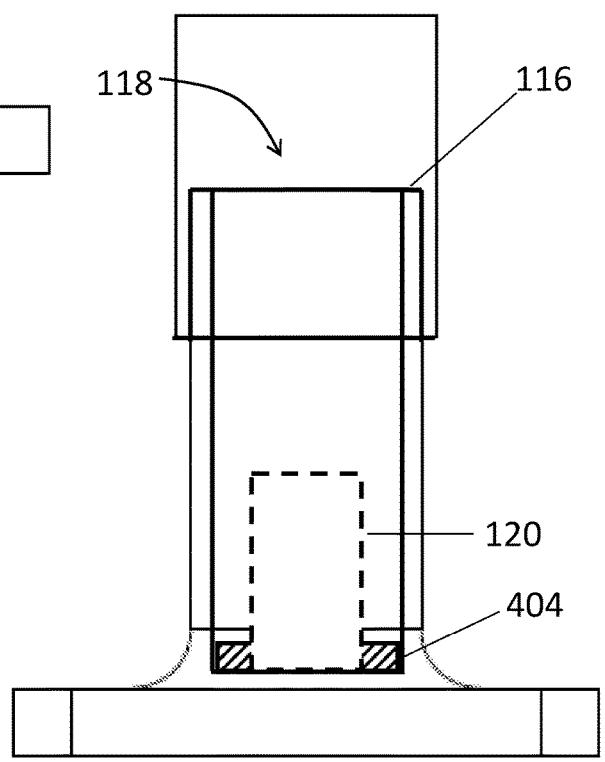

In some implementations, the holder 100 further includes one or more adaptors configured to accommodate vials 120 having different diameters. For example, the adaptor can be a sleeve 402 as depicted by FIGS. 4A and 4B. The sleeve 402 is configured as a tube extending through a vertical length 406 of the interior space 118. The vial 120 fits snuggly in the sleeve 402, and the sleeve 402 fits snuggly in the interior space 118. In some implementations, the sleeve 402 does not extend up to the opening 116, for example forming a ring that extends only partially up the vertical length 406, such as depicted by ring 404 in FIG. 4C. In some implementations, the sleeve 402 includes a cut out that can be aligned with the window 210, so that viewing through window 210 is not blocked by sleeve 402. In some implementations, the adaptor can be a compressible sleeve or ring so that several different size vials can be accommodated by a single sleeve or ring. In some implementations, the sleeve 402 has grooves on the interior surface (facing the vial) formed in the vertical direction. Such grooves can aid in loading and unloading the vial 120 by providing flow channels for air.

Figure 5A:
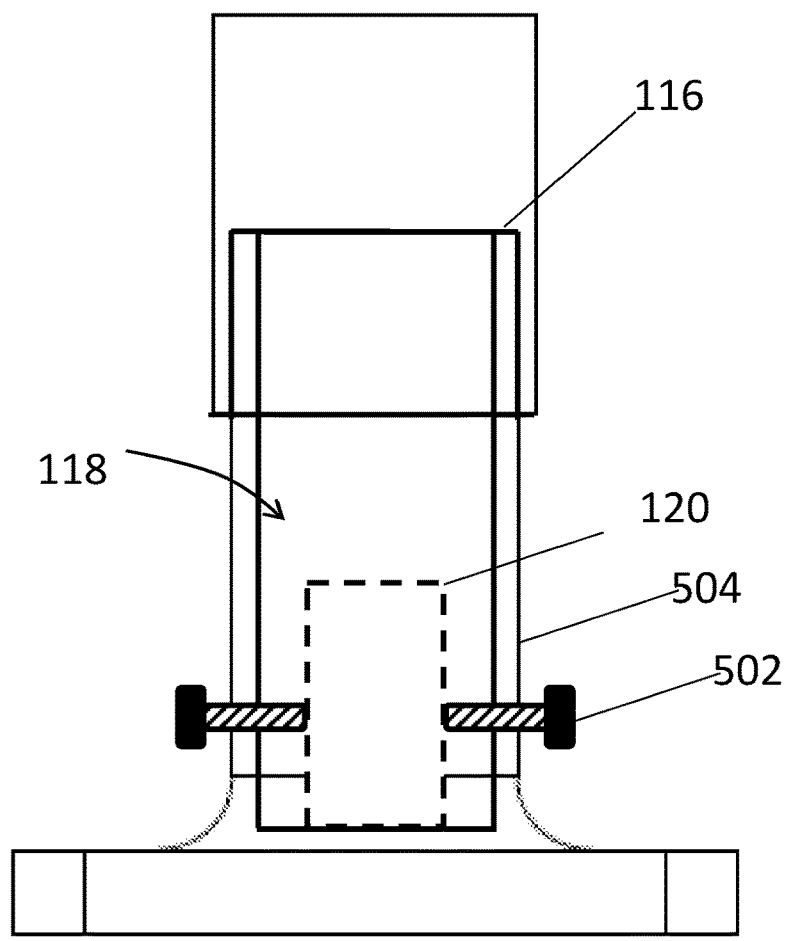
FIG. 5A-5D show a vial holder including centering elements, according to another implementation.
Figure 5B:
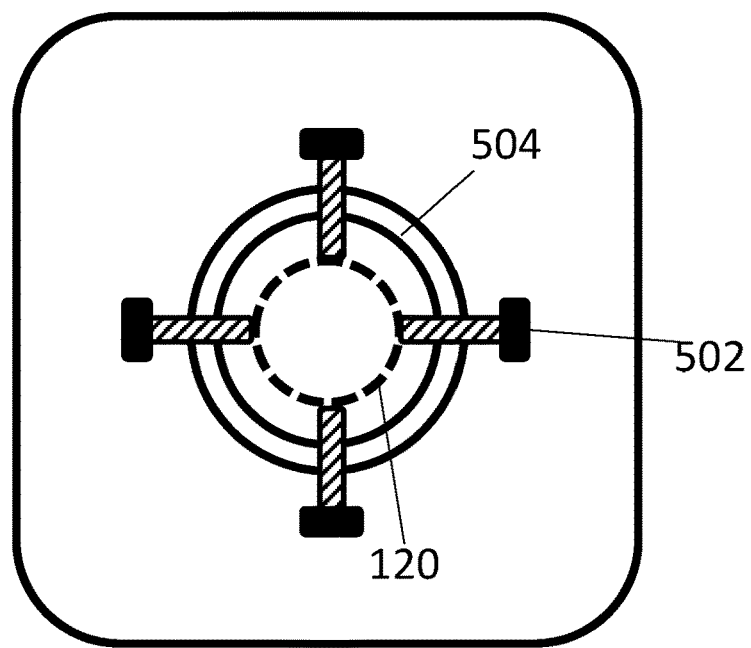
Figure 5C:
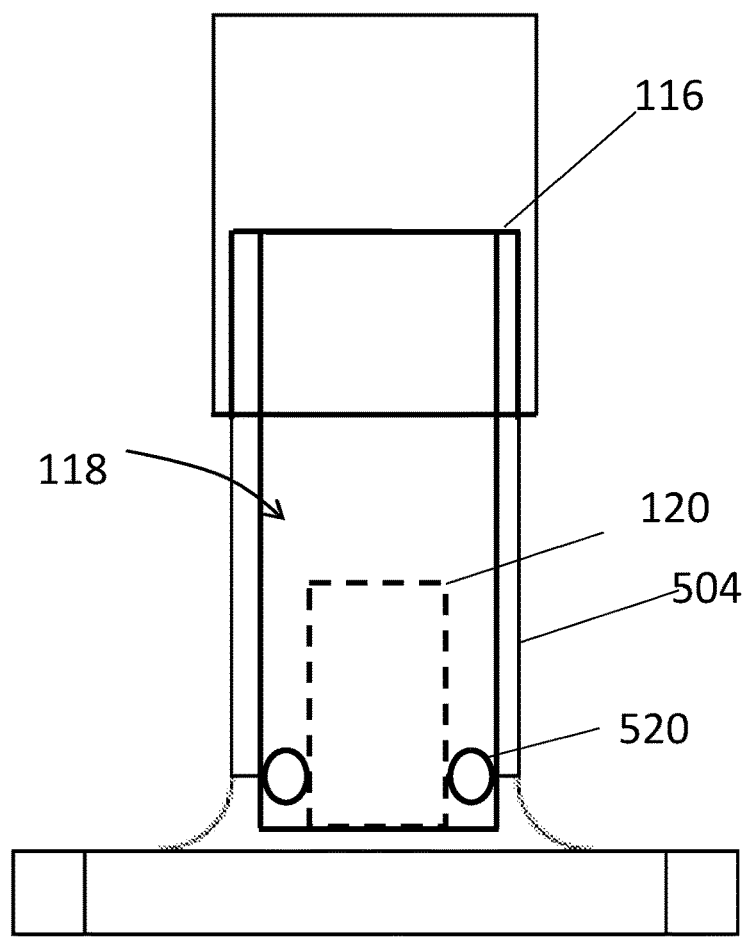
Figure 5D:
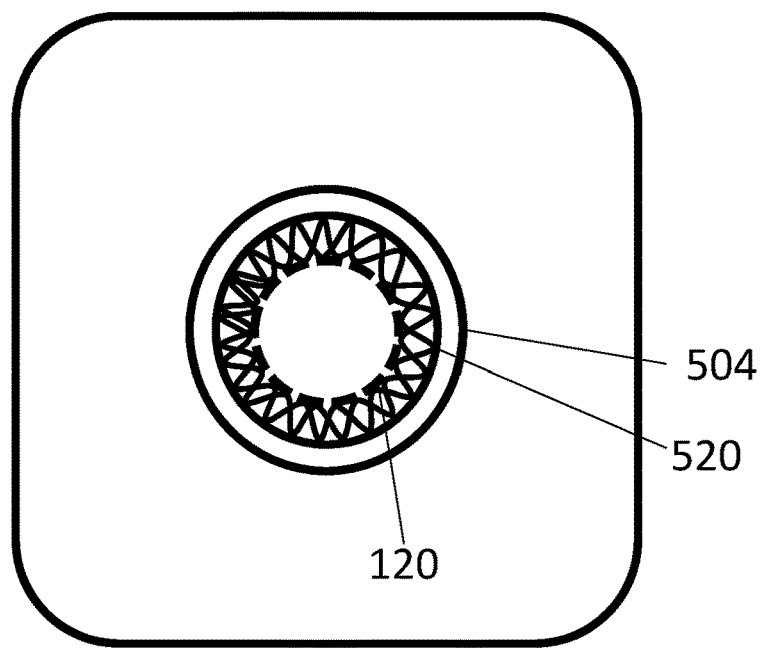

Other centering elements are contemplated, some of which are detailed here. In some other implementations, the adaptor can be one or more set screws (e.g., 3 or more), such as the screws 502 shown in FIGS. 5A and 5B. The screws 502 are threaded through base wall 504 where they can be adjusted to center the vial 120. In another implementation, the adaptor is configured as a chuck, such as a chuck having three or four jaws that move radially in or out to surround and center the vial 120. In some implementations, the adaptor can be a centering spring. An example of a centering spring 520 is shown in FIGS. 5C and 5D. The centering spring 520 is positioned between the base wall 504 and the vial 120.

In some implementations, the holder 100 includes autoclavable materials. For example, materials used in holder 100 do not degrade or deform at temperatures above 100 deg C. (e.g., above 120 deg C., above 140 deg C.), and/or the materials are not porous. Some possible materials for construction of the holder 100 include metals such as aluminum and steel, ceramics such as tinted glass, high temperature thermoset plastics, and high temperature thermoplastics. In some implementations, one or more components of the holder 100 are formed by additive manufacturing, such as 3D printing. In some implementations, one or more components of the holder 100 are formed by subtractive manufacturing such as by CNC milling.

In some implementations, the holder 100 includes heating/cooling elements coupled to one or more of the base 102 and the cap 104. For example, the holder 100 can be implemented with a hot plate that is part of the holder 100 or the holder 100 can be place on a hot plate where the holder 100 can be made of a thermally conductive material such as a metal. In other implementations, heating elements can be included in the walls of the base 102 and cap 104, such as resistive heaters or fluid conduits for heating/and cooling fluids to flow through. In some other implementations, heating can be provided by heating tape wrapping portions of the holder 100 such as the second end 108. In other implementations, a heating jacket can be used to cover portions of the holder 100. The heating tape and heating jacket can be externally added items or integrated as part of the holder 100.

Figure 6:
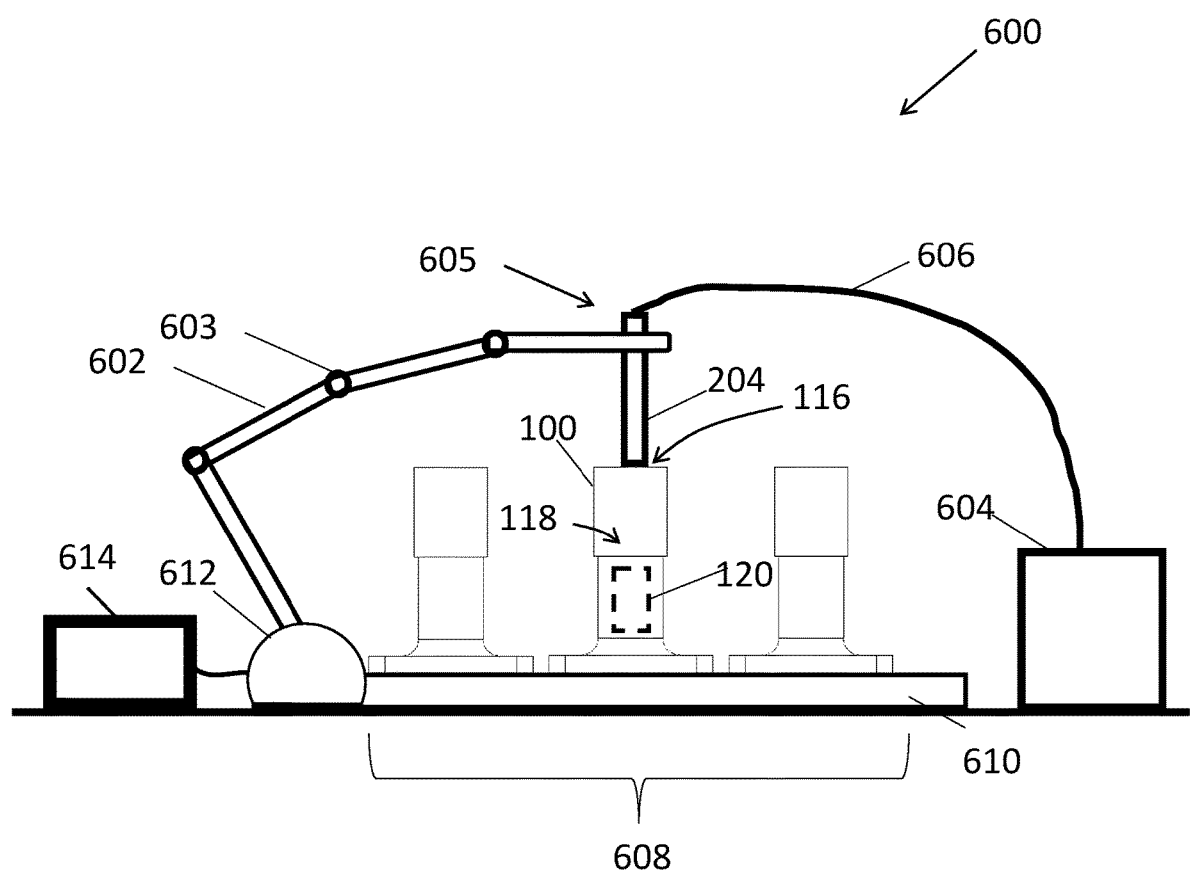
FIG. 6 shows a system for measuring a signal from a sample, according to some implementations.

In some implementations, the holder 100 is included as part of a measurement system 600 for measuring signal (e.g. a scattered light signal) from a sample, as depicted in FIG. 6. The system includes an adjustable probe arm 602. The arm 602 is configured for holding the probe 204 at holding end 605, as well allowing the raising and lowering or the probe 204 through the opening 116 and into the vial 120 placed in the interior space 118. In some implementations, the system includes the probe 204 and supporting systems such as a spectrometer 604 connected to the probe 204, for example by a fiber optic cable 606.

In some implementations, the system 600 includes a plurality of the holders 100 configured as a single unit or an array 608. For example, one or more holders 100 can be arrayed on a stage 610. In some implementations, the stage 610 includes a jig for placement of the holders 100 in a defined pattern, or alternatively the holders 100 and stage 610 can include complementary snap or interference fits such as studs and stud receptacles. In some implementations, the holders 100 can connect to each other (e.g., by interference fits or magnetically) without the use of the stage 610 to form the array 608.

In some implementations, a motor 612 is coupled to the arm 602 and stage 610 to provide relative movement of the arm 602 to the stage 602. For example, the motor 612 in some implementations provides a relative xyz movement of the arm 602 to the stage 610. The motor 612 is coupled to a controller 614 that provides instructions to the motor for the relative movement between arm 602 and stage 610. In some implementations, several motors can be used, for example at one or more joints 603, each of which can be controlled by controller 614. The controller can include or be connected to a computer, memory, input/output devices for receiving and sending instructions, user interfaces, and can include algorithms for executing the relative xyz movement. In some implementations, the jig for placement of the holders 100 is formed as a continuous loop such as a carousel for the holders 100, where the motor 612, in addition to providing movement of the arm 602, can provide movement to the carousel. In some implementations, the stage 610 provides a continuous surface such as a conveyor belt which is coupled to the motor 612. It is also contemplated that in some implementations, the system 600 includes cleaning stations for cleaning/rinsing the probe 204. In some implementations, the probe 204, used with or without the system 600, is a Raman probe.

Figure 7:
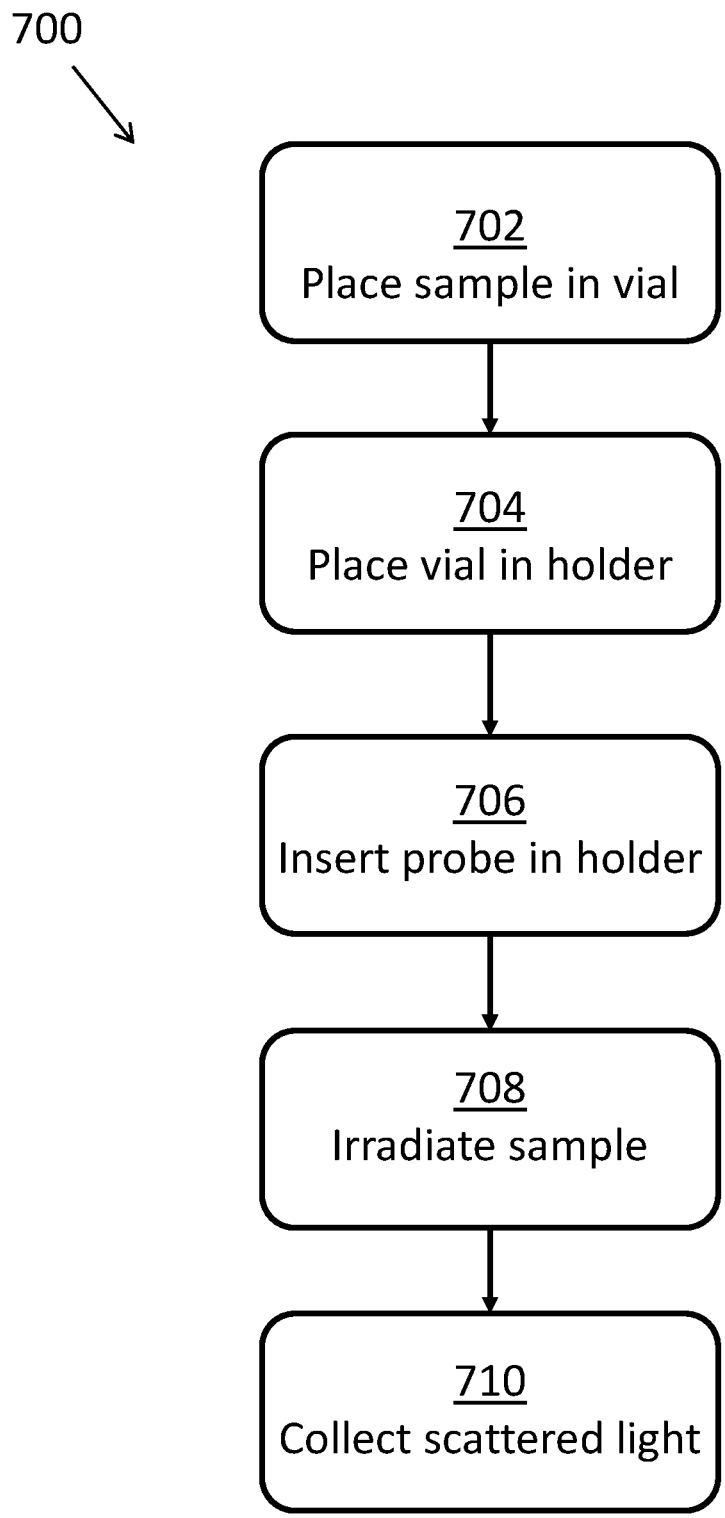
FIG. 7 is a flow diagram depicting a method for measuring scattered light from a sample, according to some implementations.

FIG. 7 is a flow diagram 700 showing a method for measuring scattered light from a sample. In step 702, a sample is placed in a vial 120. The vial 120 is in subsequent step 704 placed in the holder 100. This is done by removing the cap 104, placing the vial 120 in the interior space 118, securing the cap 104 on the second end 108. This may also include placing a sleeve 402 into the interior space 118 or adjusting screws 502 to ensure a snug fit of the vial 120 in the interior space 118. In implementations where the window 210 is large enough, the sample can be placed in the interior space 118 through the window 210. Step 706 includes inserting the probe 204 through the inlet 124 of the cap 104, and immersing the probe (e.g., a portion of the probe such as a tip of the probe) into the sample. If the window 210 is included, the window 210 can be used to view the probe 204 in the vial 120 and ensure optimal placement (e.g. where at least a tip of the probe 204 is immersed in the sample and the probe does not touch the vial 120). In Step 708, the sample is irradiated with radiation such as UV-Vis light energy of one or more wavelengths. Scattered sample light induced by the irradiation of the sample is collected into the probe 204 in step 710. In some implementations, the probe 204 is optically connected to the spectrometer 604 and the scattered light is analyzed using the spectrometer 604. For example, the probe can include a focusing lens at a tip that is immersed in the sample when immersing the probe 204 into the sample, where the focusing lens collects the light and provides it to other optical elements in the probe for further processing such as sending it to the spectrometer 604. In some implementations, the probe 204 is a Raman probe. In some implementations, the sample incudes a liquid.

The following numbered paragraphs 1-20 provide various examples of the embodiments disclosed herein.

Paragraph 1. A holder (100) comprising: a base (102) including; a first end (106) including a bottom (110) configured for placement of the base (102) on a substantially flat surface (112); a second end (108) extending from the first end (106); an opening (116) in the second end (108) opposite the bottom (110) and providing access to an interior space (118) in the base, said interior space (118) configured for placement of a vial (120) therein; an aperture (122) in the bottom 112, opposite the opening (116), and said aperture (122) is in fluid communication with the interior space (118); and a cap (104) configured to mate with the second end (108) and includes an inlet (124) configured to accept a probe (204) through the inlet (124) and the opening (116) and centrally into the vial (120); wherein the base (102) and the cap (104) include one or more materials that are opaque or optically black.

Paragraph 2. The holder (100) according to paragraph 1, further comprising a window (210) and window cover (212) formed in a side wall of the base and configured to view the interior space (118) for the probe (204) and the vial (120) placement.

Paragraph 3. The holder (100) according to paragraph 1 or 2, wherein the inlet (124) includes a sealing element configured to adjust to probes (204) having different diameters.

Paragraph 4. The holder (100) according to any one of paragraphs 1-3, further comprising one or more adaptors configured to accommodate vials 124 having different diameters.

Paragraph 5. The holder according to paragraph 4, wherein the adaptor is a sleeve (402) or ring adaptor (404).

Paragraph 6. The holder (100) according to paragraph 4, wherein the adaptor is a centering spring (520), a chuck or a set screw (502).

Paragraph 7. The holder (100) according to any one of paragraphs 1-6, wherein the cap (104), the probe (204), the base (102) and the substantially flat surface (112) provide a lighttight environment to the interior space (118).

Paragraph 8. The holder (100) according to any one of paragraphs 1-7, further comprising an optically black or opaque plug configured to mate with the aperture (122).

Paragraph 9. The holder (100) according to any one of paragraphs 1-8, wherein the material is optically black in a range of 500 to 1200 nm.

Paragraph 10. The holder (100) according to any one of paragraphs 1-9, wherein the material transmits less than about 99% of light in a range of 500 to 1200 nm.

Paragraph 11. The holder (100) according to any one of paragraph 1-10, wherein the base (102) and the cap (104) are autoclavable.

Paragraph 12. The holder (100) according to any one of paragraphs 1-11, further comprising a heating or cooling element coupled to one or more of the base (102) and the cap (104).

Paragraph 13. A system (600) for measuring a signal from a sample comprising: the holder (100) according to any one of paragraphs 1-12, and an adjustable probe arm (602).

Paragraph 14. The system (600) according to paragraph 13 including a plurality of the holders (100) configured as a single unit.

Paragraph 15. The system (600) according to paragraph 13 or 14 further including a stage (610) for placement of the holder (100) and a motor (612), wherein said motor (612), arm (602) and the stage 610 are coupled and configured for xyz movement of the probe (100) relative to the stage (610).

Paragraph 16. The system (600) according to any one of paragraphs 13-15, wherein the probe is a Raman probe.

Paragraph 17. A method for measuring scattered light comprising: placing a sample in a vial (120); placing the vial (120) in the holder (100) according to any one of paragraphs 1-12; inserting a probe (204) through the inlet (124) of the cap (104) and immersing the probe (204) into the sample; irradiating the sample with light from the immersed probe (204); and collecting a scattered sample light into the probe (204).

Paragraph 18. The method according to paragraph 17, wherein the probe (204) is optically connected to a spectrometer (604) and the scattered sample light is analyzed using the spectrometer (604).

Paragraph 19. The method according to paragraph 17 or 18, wherein the probe (204) is a Raman probe.

Paragraph 20. The method according to any one of paragraphs 17-19, wherein the sample includes a liquid.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above implementation and examples but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A holder (100) comprising:
   a base (102) including;
      a first end (106) including a bottom (110) configured for placement of the base (102) on a substantially flat surface (112);
      a second end (108) extending from the first end (106);
      an opening (116) in the second end (108) opposite the bottom (110) and providing access to an interior space (118) in the base, said interior space (118) configured for placement of a vial (120) therein;
      an aperture 122 in the bottom 112, opposite the opening (116), and said aperture 122 is in fluid communication with the interior space (118); and
   a cap (104) configured to mate with the second end (108) and includes an inlet (124) configured to accept a probe (204) through the inlet (124) and the opening (116) and centrally into the vial (120);
   wherein the base (102) and the cap (104) include one or more materials that are opaque or optically black.

2. The holder (100) according to claim 1, further comprising a window (210) and window cover (212) formed in a side wall of the base and configured to view the interior space (118) for the probe (204) and the vial (120) placement.

3. The holder (100) according to claim 1, wherein the inlet (124) includes a sealing element configured to adjust to probes (204) having different diameters.

4. The holder (100) according to claim 1, further comprising one or more adaptors configured to accommodate vials 124 having different diameters.

5. The holder according to claim 4, wherein the adaptor is a sleeve (402) or ring adaptor.

6. The vial holder (100) according to claim 4, wherein the adaptor is a centering spring (520), a chuck, or a set screw.

7. The holder (100) according to claim 1, wherein the cap (104), the probe (204), the base (102) and the substantially flat surface (112) provide a lighttight environment to the interior space (118).

8. The holder (100) according to claim 1, further comprising an optically black or opaque plug configured to mate with the aperture (122).

9. The holder (100) according to claim 1, wherein the material is optically black in a range of 500 to 1200 nm.

10. The holder (100) according to claim 1, wherein the material transmits less than about 99% of light in a range of 500 to 1200 nm.

11. The holder (100) according to claim 1, wherein the base (102) and the cap (104) are autoclavable.

12. The holder (100) according to claim 1, further comprising a heating or cooling element coupled to one or more of the base (102) and the cap (104).

13. A system (600) for measuring a signal from a sample comprising:
   the holder according to claim 1, and an adjustable probe arm.

14. The system (600) according to claim 13 including a plurality of the holders (100) configured as a single unit.

15. The system (600) according to claim 13 further including a stage (610) for placement of the holder (100) and a motor (612), wherein said motor (612), arm (602) and the stage 610 are coupled and configured for xyz movement of the probe (100) relative to the stage (610).

16. The system (600) according to claim 13, wherein the probe (204) is a Raman probe.

17. A method for measuring scattered light comprising:
   placing a sample in a vial (120);
   placing the vial (120) in the holder (100) according to claim 1;
   inserting a probe (204) through the inlet (124) of the cap (104) and immersing the probe (204) into the sample;
   irradiating the sample with light from the immersed probe (204); and
   collecting a scattered sample light into the probe (204).

18. The method according to claim 17, wherein the probe is optically connected to a spectrometer (604) and the scattered sample light is analyzed using the spectrometer (604).

19. The method according to claim 17, wherein the probe (204) is a Raman probe.

20. The method according to claim 17, wherein the sample includes a liquid.

* * * * *